(12) United States Patent
Nemoto et al.

(10) Patent No.: US 11,699,344 B2
(45) Date of Patent: Jul. 11, 2023

(54) TRAFFIC LIGHT MANAGEMENT SYSTEM AND TRAFFIC LIGHT MANAGEMENT METHOD

(71) Applicant: TOYOTA JIDOSHA KABUSHIKI KAISHA, Toyota Aichi-ken (JP)

(72) Inventors: Kazuki Nemoto, Susono Shizuoka-ken (JP); Shin Tanaka, Numazu Shizuoka-ken (JP); Satoshi Nakamura, Susono Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 70 days.

(21) Appl. No.: 17/533,326

(22) Filed: Nov. 23, 2021

(65) Prior Publication Data
US 2022/0223034 A1    Jul. 14, 2022

(30) Foreign Application Priority Data
Jan. 13, 2021   (JP) .................. 2021-003706

(51) Int. Cl.
| | |
|---|---|
| G08G 1/07 | (2006.01) |
| G06F 3/14 | (2006.01) |
| G06V 20/58 | (2022.01) |
| G08G 1/08 | (2006.01) |
| G08G 1/056 | (2006.01) |
| G08G 1/005 | (2006.01) |
| G08G 1/01 | (2006.01) |

(52) U.S. Cl.
CPC .............. *G08G 1/07* (2013.01); *G06F 3/14* (2013.01); *G06V 20/58* (2022.01); *G08G 1/005* (2013.01); *G08G 1/0125* (2013.01); *G08G 1/056* (2013.01)

(58) Field of Classification Search
CPC ........ G08G 1/07; G08G 1/005; G08G 1/0125; G08G 1/056; G06V 20/58; G06F 3/14
See application file for complete search history.

(56) References Cited

U.S. PATENT DOCUMENTS

| | | | |
|---|---|---|---|
| 2017/0330456 A1* | 11/2017 | Miller | .............. G08G 1/096758 |
| 2019/0206236 A1* | 7/2019 | Tao | ......................... G08G 1/162 |

(Continued)

FOREIGN PATENT DOCUMENTS

JP     2019-087076 A    6/2019

*Primary Examiner* — Sisay Yacob
(74) *Attorney, Agent, or Firm* — Dinsmore & Shohl LLP (57) ABSTRACT

A traffic light management system that manages display of traffic lights includes a communication device, a control device, and a map database. The control device performs emergency control of the display when abnormal traveling information indicating the information on an abnormal traveling vehicle is included in the information received from a communication vehicle. In the emergency control, the control device predicts a future trajectory of the abnormally traveling vehicle based on the abnormal traveling information. Next, the control device generates the emergency control signal for temporarily prohibiting passage at an intersection and a crosswalk on a road along the future trajectory based on the map information and the future trajectory. After that, the control device sends the emergency control signal to controlled traffic lights. The controlled traffic lights are each a traffic light at the intersection and the crosswalk on a road along the future trajectory.

6 Claims, 9 Drawing Sheets

(56) References Cited

U.S. PATENT DOCUMENTS

| | | | |
|---|---|---|---|
| 2019/0251838 A1* | 8/2019 | Bernhardt | G08G 1/087 |
| 2020/0193821 A1* | 6/2020 | Kawaharada | B60W 30/18154 |
| 2020/0242922 A1* | 7/2020 | Dulberg | G08G 1/012 |
| 2020/0365015 A1* | 11/2020 | Nguyen | G08G 1/0129 |
| 2021/0174677 A1* | 6/2021 | Oh | G08G 1/095 |

* cited by examiner

TRAFFIC LIGHT MANAGEMENT SYSTEM AND TRAFFIC LIGHT MANAGEMENT METHOD

CROSS-REFERENCE TO RELATED APPLICATION

This application claims priority to Japanese Patent Application No. 2021-003706 filed on Jan. 13, 2021, incorporated herein by reference in its entirety.

BACKGROUND

1. Technical Field

The present disclosure relates to a system and a method for managing the display of traffic lights.

2. Description of Related Art

Japanese Unexamined Patent Application Publication No. 2019-87076 (JP 2019-87076 A) discloses a system that includes a plurality of vehicles traveling in a platoon and a server communicating with these vehicles individually. The server of this conventional system detects an abnormal vehicle among the plurality of vehicles based on the behavior information on each vehicle. An abnormal vehicle is detected based on the statistical processing for the behavior information. When an abnormal vehicle is detected, the server identifies the abnormal part based on the behavior information on the abnormal vehicle received from a normal vehicle traveling in front of or behind the abnormal vehicle. An abnormal part may also be identified using V2V between the abnormal vehicle and the normal vehicle. When the abnormal part is identified, the server provides the information on the abnormal part to the abnormal vehicle or the normal vehicles.

SUMMARY

However, in the conventional system described above, the information on an abnormal part is provided only to a limited range. Therefore, even when the abnormality is such that it may lead to abnormal traveling, there is no way for the vehicles and pedestrians around the platooning vehicles to know the occurrence of the abnormality. For this reason, when an accident occurs due to abnormal traveling, there is a possibility that surrounding vehicles, pedestrians, etc. may be involved in the accident.

In view of the foregoing, the present disclosure provides a technique that minimizes the effect of an accident that may be caused by abnormal traveling even if an abnormality occurs and a vehicle starts traveling abnormally due to the occurrence of the abnormality.

A first disclosure is a traffic light management system that manages the display of traffic lights. The first disclosure has the following features. The traffic light management system includes a communication device, a control device, and a map database. The communication device is configured to communicate with the traffic lights and to communicate with a communication vehicle having the communication function. The control device is configured to control the display based on information received from the communication vehicle. The map database is configured to store map information. The control device is configured to perform emergency control of the display when abnormal traveling information indicating information on an abnormally traveling vehicle is included in the information received from the communication vehicle. In the emergency control, the control device is configured to predict a future trajectory of the abnormally traveling vehicle based on the abnormal traveling information, to generate an emergency control signal for temporarily prohibiting passage at an intersection and a crosswalk on a road along the future trajectory based on the map information and the future trajectory, and to send the emergency control signal to controlled traffic lights each indicating a traffic light at the intersection and the crosswalk.

A second disclosure according to the first disclosure may further have the following features. The communication vehicle may include an acquisition device, a processing device, and an in-vehicle communication device. The acquisition device may be configured to acquire driving environment information on the communication vehicle. The processing device may be configured to perform abnormal traveling determination of vehicles around the communication vehicle based on the driving environment information. The in-vehicle communication device may be configured to communicate with the communication device. In the abnormal traveling determination, the processing device may be configured to determine whether there is the abnormally traveling vehicle around the communication vehicle, to generate the abnormal traveling information as information indicating the traveling state of the abnormally traveling vehicle when it is determined that there is the abnormally traveling vehicle, and to send the abnormal traveling information to the in-vehicle communication device.

A third disclosure according to the second disclosure may further have the following features. In the emergency control, the control device may be configured to repeatedly perform the sending of the emergency control signal and the determination as to whether the reception of the abnormal traveling information from the communication vehicle is ended, to determine whether the communication vehicle has arrived before the controlled traffic light based on the information from the communication vehicle when it is determined that the reception of the abnormal traveling information is ended, and to stop the sending of the emergency control signal to the controlled traffic light when it is determined that the communication vehicle has arrived before the controlled traffic light.

A fourth disclosure according to the first disclosure may further have the following features. The communication vehicle may include an acquisition device, a processing device, and an in-vehicle communication device. The acquisition device may be configured to acquire driving environment information on the communication vehicle. The processing device may be configured to perform the abnormal traveling determination of the communication vehicle itself based on the driving environment information. The in-vehicle communication device may be configured to communicate with the communication device. In the abnormal traveling determination, the processing device may be configured to determine whether the communication vehicle is the abnormally traveling vehicle, to generate the abnormal traveling information as information indicating the traveling state of the communication vehicle when it is determined that the communication vehicle is the abnormally traveling vehicle, and to send the abnormal traveling information to the in-vehicle communication device.

A fifth disclosure according to the fourth disclosure may further have the following features. In the emergency control, the control device may be configured to repeatedly perform the sending of the emergency control signal and the determination as to whether the communication vehicle has passed the controlled traffic light and to stop the sending of the emergency control signal to the controlled traffic light when it is determined that the communication vehicle has passed the controlled traffic light.

A sixth disclosure is a traffic light management method for managing the display of traffic lights. The sixth disclosure has the following features. The traffic light management method includes, by a control device that controls the display, communicating with a communication vehicle having a communication function, predicting a future trajectory of an abnormally traveling vehicle based on abnormal traveling information when the abnormal traveling information indicating information on the abnormally traveling vehicle is included in information received from the communication vehicle, generating an emergency control signal for temporarily prohibiting passage at an intersection and a crosswalk on a road along the future trajectory based on map information and the future trajectory, and sending the emergency control signal to a traffic light at the intersection and the crosswalk.

According to the first or sixth disclosure, even if a vehicle is traveling abnormally for some reason, emergency control is performed and the emergency control signal is sent to the controlled traffic lights. This makes it possible to alert the vehicles and pedestrians around the future trajectory of the abnormally traveling vehicle to this abnormal traveling. Therefore, it is possible to minimize the effect of an accident caused by the abnormal traveling.

According to the second disclosure, the communication vehicle performs the abnormal traveling determination. Therefore, it is possible to detect that there is an abnormally traveling vehicle around the communication vehicle.

According to the third disclosure, when there is an abnormally traveling vehicle around the communication vehicle, the sending of the emergency control signal to the controlled traffic lights can be stopped. Therefore, it is possible to avoid traffic paralysis caused by the continuous sending of the emergency control signal.

According to the fourth disclosure, the communication vehicle performs the abnormal traveling determination for itself. Therefore, it is possible to detect that the communication vehicle itself is an abnormally traveling vehicle.

According to the fifth disclosure, when the communication vehicle itself is an abnormally traveling vehicle, the sending of the emergency control signal to the controlled traffic signals can be stopped. Therefore, it is possible to avoid traffic paralysis caused by the continuous sending of the emergency control signal.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A traffic light management system and a traffic light management method according to an embodiment of the present disclosure will be described below with reference to the drawings. The traffic light management method according to the embodiment is implemented by computer processing performed in the traffic light management system according to the embodiment. Note that, in the figures, the same reference numerals will be given to the same or similar components and the description thereof will be simplified or omitted.

1. Outline of Present Disclosure
1-1. Communication Information

Figure 1:
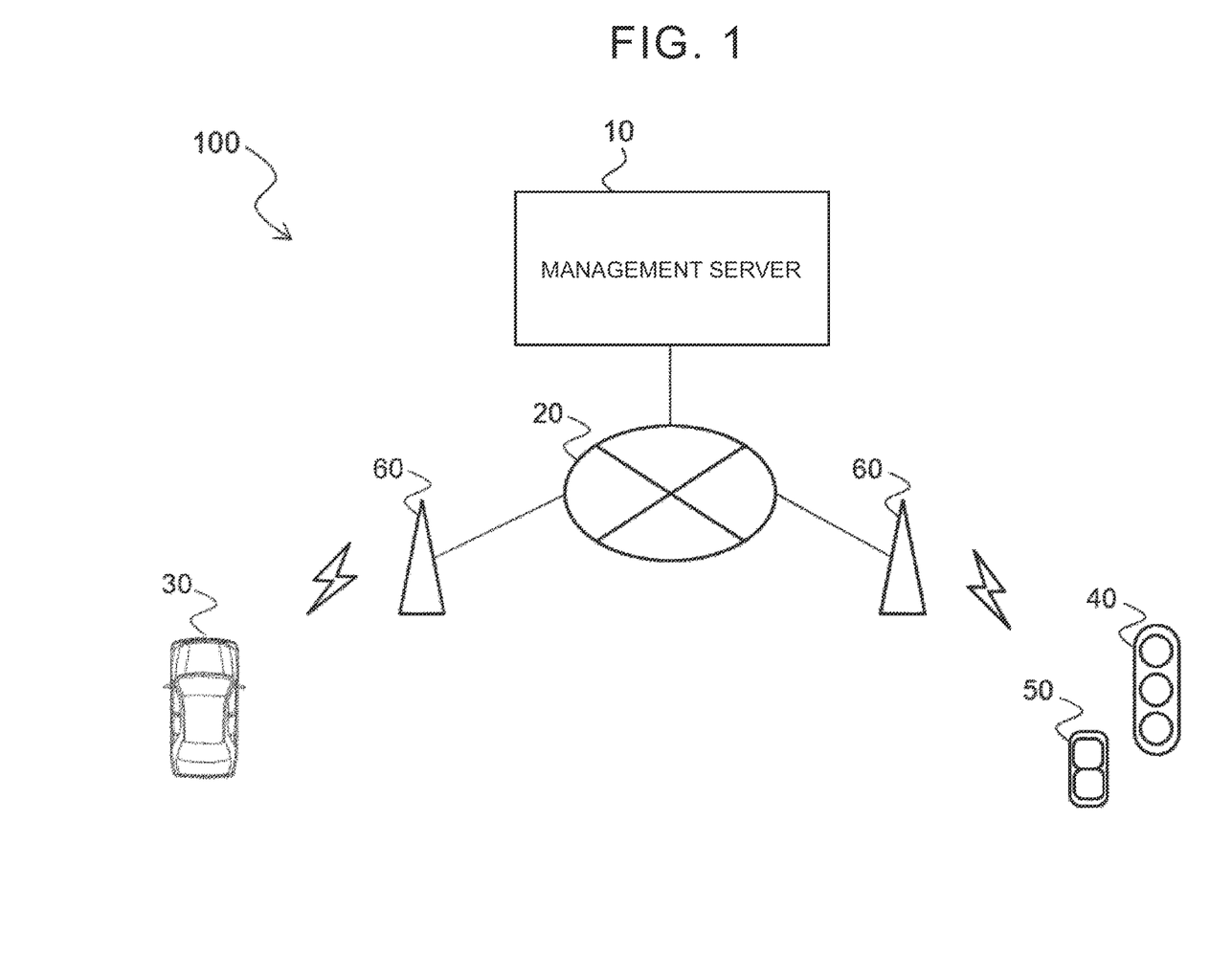
FIG. 1 is a schematic diagram of a traffic light management system according to an embodiment.

FIG. 1 is a schematic diagram of the traffic light management system according to the embodiment. A traffic light management system 100, shown in FIG. 1, includes a management server 10. The management server 10 communicates with a communication vehicle 30, and with traffic lights 40 and 50, via a network 20 and a base station 60. The communication vehicle 30 is a moving object, such as a vehicle, having the communication function. The traffic lights 40 and 50 are traffic lights installed on a road. The traffic light 40 is used mainly to control the traffic of moving objects. The traffic light 50 is used mainly to control the traffic of pedestrians. Typically, the traffic light 50 is provided adjacent to a pedestrian crossing. Although the traffic light 40 is a three-position system and the traffic light 50 is a two-position system in FIG. 1, the lighting system used for these traffic lights is not particularly limited.

The management server 10 communicates with the communication vehicle 30 to acquire various types of information on the communication vehicle 30. Examples of various types of information include the ID information on the communication vehicle 30 and the traveling state information on the communication vehicle 30. Examples of the traveling state information include the speed information and the position information on the communication vehicle 30. The position information is, for example, the latitude/longitude information. As will be described later, the management server 10 has map information. The management server 10 combines the map information and the position information to detect the current position of the communication vehicle 30. In addition, the management server 10 uses the history of the position information to detect the current traveling direction of the communication vehicle 30. The various types of information on the communication vehicle 30 may include the external recognition information around the communication vehicle 30 acquired by the communication vehicle 30.

The management server 10 also communicates with the traffic lights 40 and 50 to acquire the display information on these traffic lights. Examples of types of the traffic light 40 include the following two types: one is a program type that controls the light according to a preset control pattern and the other is a traffic-sensitive type that changes the light from "red" to "green" when a moving object is detected in front of the traffic light 40. Examples of types of the traffic light 50 include the above-mentioned two types and, in addition, a push-button type that changes the light from "red" to "green" when a button is pressed by a pedestrian. The management server 10 uses the display information to detect the current lighting state of the lights (e.g., green, yellow, and red) of the traffic lights 40 and 50.

1-2. Emergency Control of Display

Figure 2:
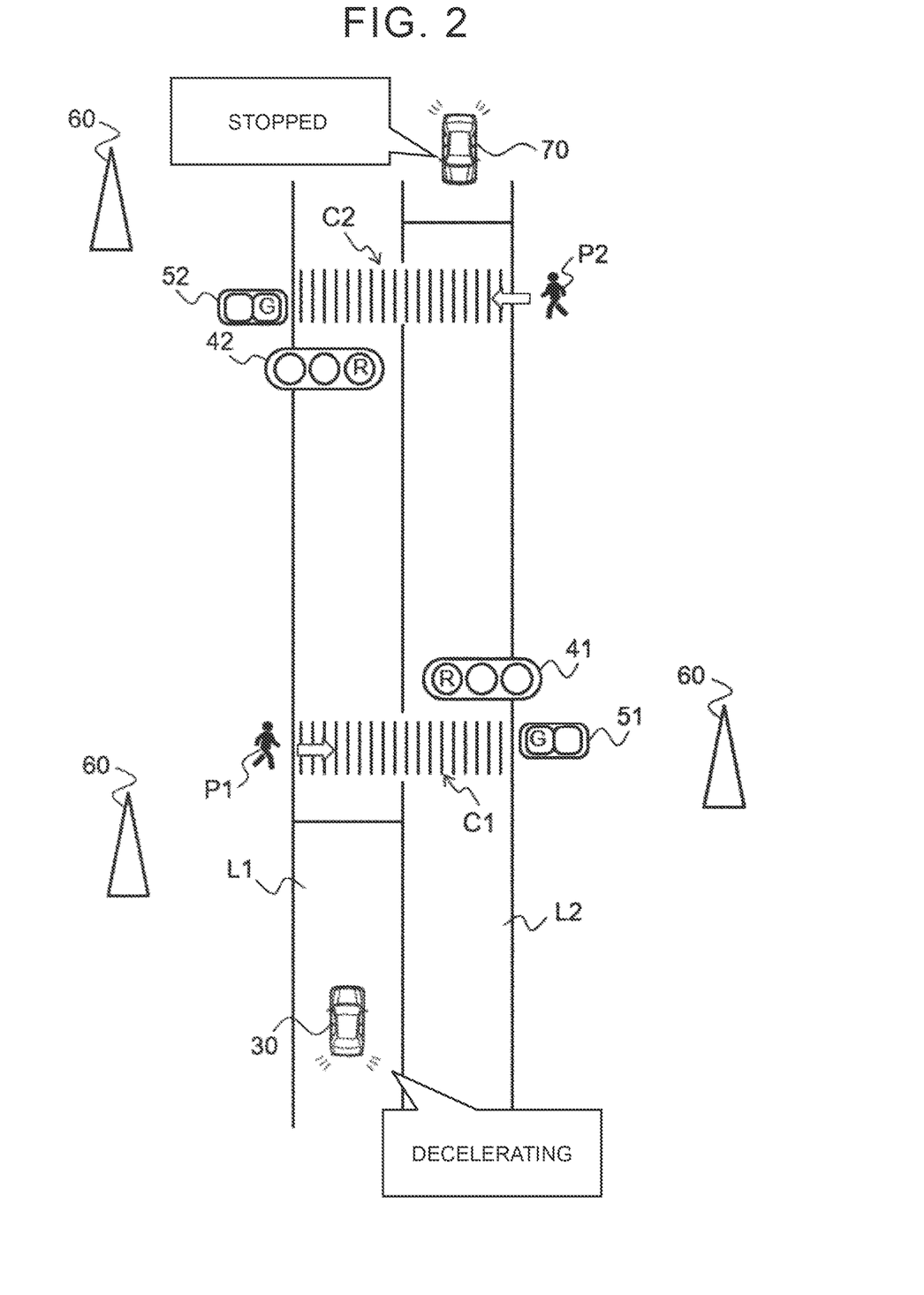
FIG. 2 is a diagram showing an example of a traffic situation before emergency control is performed.

The management server 10 also performs emergency control of the display of the traffic lights 40 and 50. When emergency control is performed, the emergency control signal ECS is sent from the management server 10 to specific traffic lights 40 and 50 to force the current light states of the traffic lights 40 and 50 to change. The emergency control will be described with reference to FIG. 2 and FIG. 3. FIG. 2 shows an example of a traffic situation before the emergency control is performed, and FIG. 3 shows an example of a traffic situation when emergency control is performed.

FIG. 2 illustrates the communication vehicle 30 traveling in lane L1 and a vehicle 70 traveling in lane L2. The vehicle 70 is an oncoming vehicle traveling in the direction opposite to the traveling direction of the communication vehicle 30. The vehicle 70 may or may not have the communication function for use in communication with the management server 10. In FIG. 2, traffic lights 41, 42, 51, and 52 are also illustrated. In the figure, the light of the traffic lights 41 and 42 is "red." Therefore, the communication vehicle 30 is decelerating to stop before pedestrian crossing C1. The vehicle 70 is stopped before pedestrian crossing C2. On the other hand, the light of the traffic lights 51 and 52 is "green." Therefore, pedestrians P1 and P2 are going to cross the pedestrian crossings C1 and C2, respectively.

Figure 3:
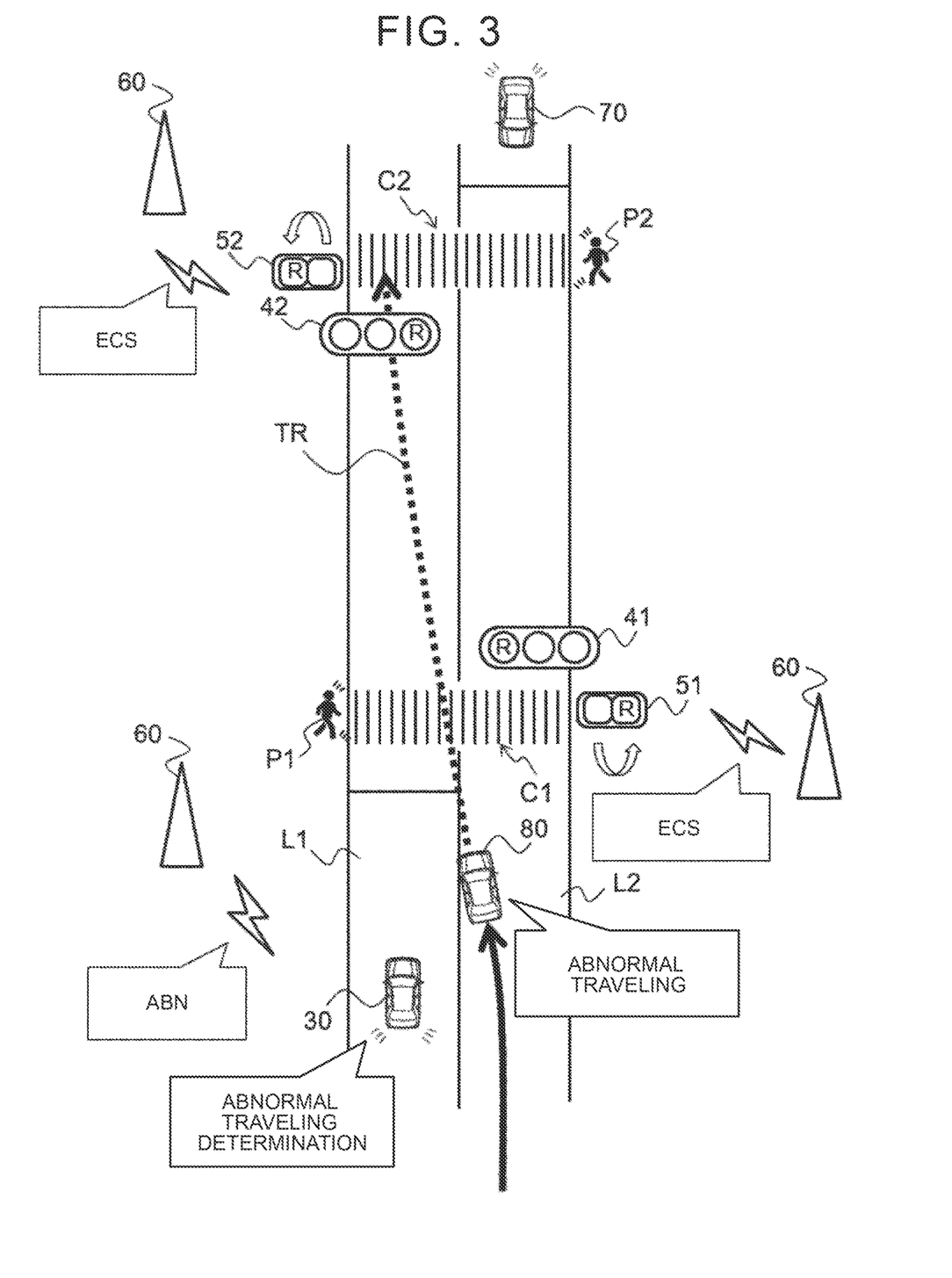
FIG. 3 is a diagram showing an example of a traffic situation when emergency control is performed.

FIG. 3 differs from FIG. 2 in that a vehicle 80 is traveling abnormally in lane L2. It is assumed that the vehicle 80 in FIG. 3 does not have the communication function for use in communication with the management server 10 or that the vehicle 80 has the communication function but the communication function is abnormal. The vehicle 80 has departed from lane L1, in which the vehicle 80 should travel, and continues traveling at accelerated speeds without following the instruction of the light of the traffic light 41. This abnormal traveling is detected by the abnormal traveling determination performed by the communication vehicle 30. In the abnormal traveling determination, it is determined whether the traveling state of the vehicle 80 is abnormal based on the external recognition information around the communication vehicle 30 and based on the traveling state information on the communication vehicle 30.

Examples of the "abnormal traveling state" include the traveling state in which the vehicle 80 ignores the instruction of the traffic light 40, the traveling state in which the vehicle 80 greatly exceeds the legal speed, and the traveling state in which the vehicle 80 meanders across a plurality of lanes. When it is determined in the abnormal traveling determination that the traveling state of the vehicle 80 is abnormal, the communication vehicle 30 sends the abnormal traveling information ABN to the management server 10. Examples of the abnormal traveling information ABN include the traveling state information (speed information and position information) on the abnormally traveling vehicle (that is, vehicle 80). The speed information on the vehicle 80 is calculated based on the traveling speed information on the communication vehicle 30 and the relative speed information on the vehicle 80 included in the external recognition information around the communication vehicle 30. As will be described later, the communication vehicle 30 has the map information. The position information on the vehicle 80 is calculated based on this map information and on the relative position information on the vehicle 80 included in the external recognition information around the communication vehicle 30.

When the abnormal traveling information ABN is received, the management server 10 predicts the future trajectory TR of the abnormally traveling vehicle based on the received abnormal traveling information. As described above, the management server 10 has the map information. Therefore, the management server 10 combines this map information with the position information on the vehicle 80, included in the abnormal traveling information ABN, to detect the current position of the vehicle 80. In addition, the management server 10 refers to the history of the position information on the vehicle 80 to detect the current traveling direction of the vehicle 80. Then, based on the current position, the current traveling direction, and the history of the speed information on the vehicle 80 included in the abnormal traveling information ABN, the management server 10 predicts the future trajectory TR. The range of time for which the future trajectory TR is predicted is, for example, a period of time from the current time to the time several seconds later.

Once the future trajectory TR is predicted, the management server 10 combines the future trajectory TR with the map information to identify the traffic lights 40 and 50 on the road along the future trajectory TR. The traffic lights to which the emergency control signal ECS is to be sent are the traffic lights 40 and 50 identified in this way. In the description below, the traffic lights 40 and 50 on the road along the future trajectory TR are collectively referred to as "controlled traffic lights." In the example shown in FIG. 3, the traffic lights 51 and 52 are controlled traffic lights. The emergency control signal ECS includes the signal for forcing the light of the controlled traffic lights to change from "green" to "red."

Changing the light of the controlled traffic lights from "green" to "red" makes it possible to alert the vehicles and pedestrians around the future trajectory TR (for example, pedestrians P1 and P2) to the abnormal traveling. When the traffic lights 40 and 50 are equipped with an alarm device that issues an alarm of a predetermined frequency, the emergency control signal ECS may include the signal for activating the alarm device of the controlled traffic lights.

Figure 4:
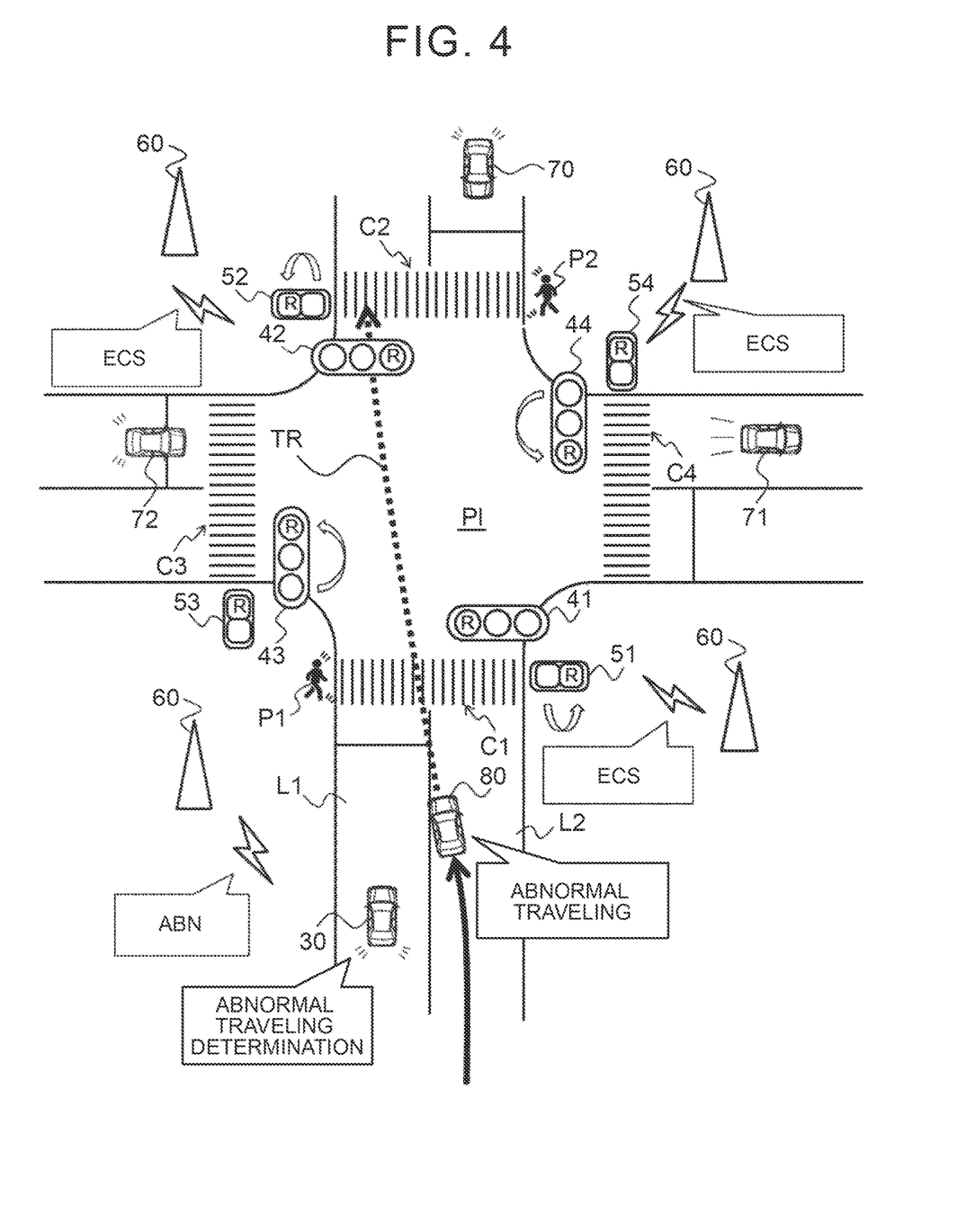
FIG. 4 is a diagram showing another example of a traffic situation when emergency control is performed.

FIG. 4 is a diagram showing another example of a traffic situation when emergency control is performed. FIG. 4 differs from FIG. 3 in that there is an intersection PI. When there is the intersection PI shown in FIG. 4, the total number of the traffic lights 40 and 50 increases. In FIG. 4, traffic lights 43, 44, 53, and 54 are illustrated as the traffic lights added to the example shown in FIG. 3. The traffic light 53 is provided adjacent to the pedestrian crossing C3. The traffic light 54 is provided adjacent to the pedestrian crossing C4. The light of traffic lights 53 and 54 is "red."

Around the intersection PI, there are vehicles 71 and 72 in addition to the vehicle 70. In the example shown in FIG. 4, the light of the traffic lights 43, 44, 51, and 52 was "green" before the emergency control was performed. Therefore, the vehicle 71 passed through the intersection PI, and the vehicle 72 was going to enter the intersection PI. The vehicles 71 and 72 may or may not have the communication function for communication with the management server 10.

As in the example shown in FIG. 3, the communication vehicle 30 sends the abnormal traveling information ABN to the management server 10 based on the result of the abnormal traveling determination. Similarly, as in the example shown in FIG. 3, the management server 10 predicts the future trajectory TR and sends the emergency control signal ECS to the controlled traffic lights in response to the abnormal traveling information ABN.

In the example shown in FIG. 4, the traffic lights 43, 44, 51 and 52 are controlled traffic lights. Changing the light of the controlled traffic lights from "green" to "red" makes it possible to alert the vehicles and pedestrians (for example, pedestrians P1, P2 and vehicle 72) around the future trajectory TR to the abnormal traveling.

Figure 5:
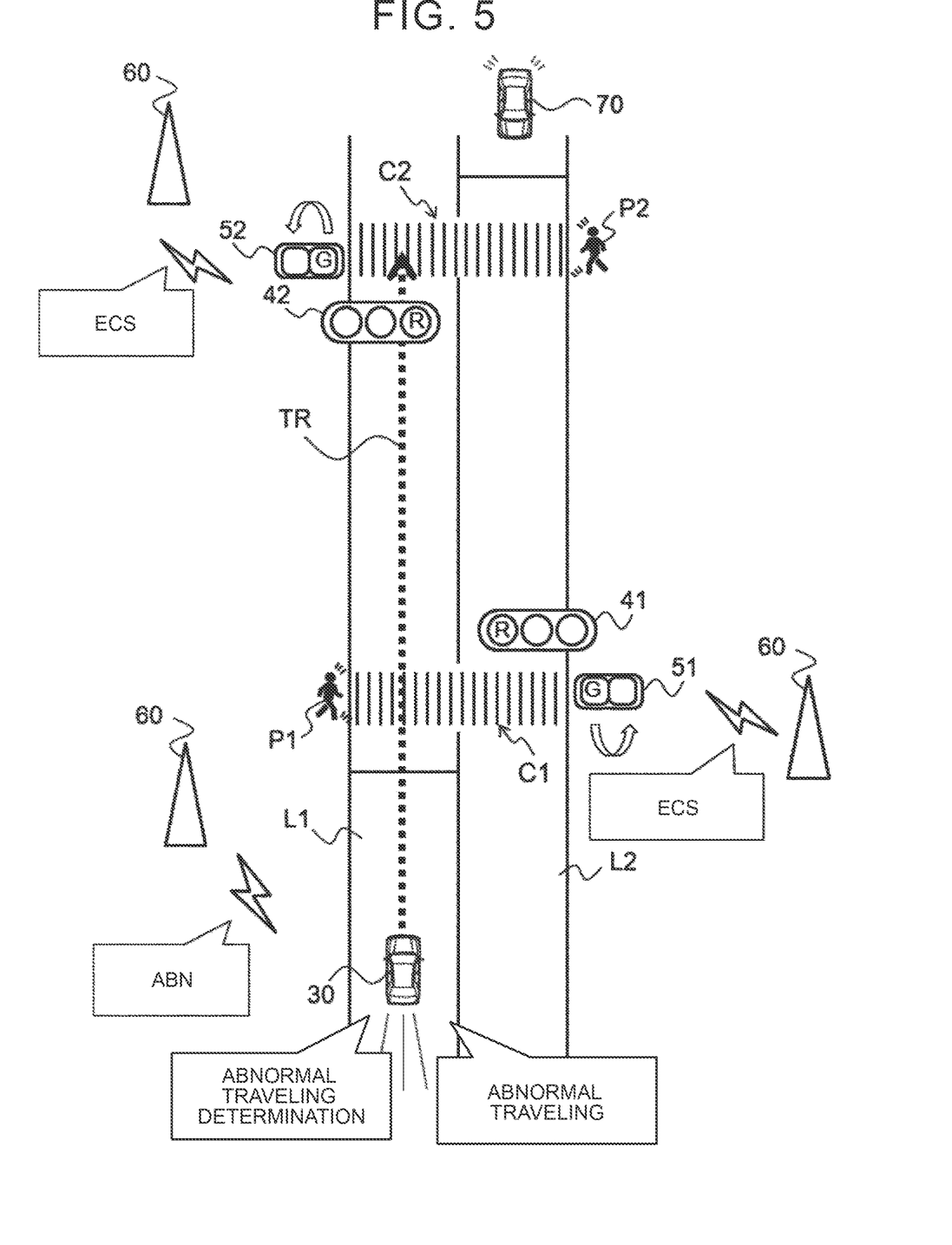
FIG. 5 is a diagram showing a still another example of a traffic situation when emergency control is performed.

FIG. 5 is a diagram showing a still another example of a traffic situation when emergency control is performed. FIG. 5 differs from FIG. 3 in the vehicle that is traveling abnormally. That is, in the example shown in FIG. 5, the communication vehicle 30 performs abnormal traveling determination for itself and determines that the communication vehicle 30 is abnormal. The abnormal traveling information ABN is sent from the communication vehicle 30 to the management server 10. It should be noted that, as in the example shown in FIG. 3, the abnormal traveling determination is performed based on the external recognition information around the communication vehicle 30 and on the traveling state information on the communication vehicle 30.

When the abnormal traveling information ABN is received, the management server 10 predicts the future trajectory TR of the abnormally traveling vehicle (that is, the communication vehicle 30) based on the received abnormal raveling information ABN. In the example shown in FIG. 5, the current position, the current traveling direction, and the history of the speed information on the communication vehicle 30 have been stored in the management server 10 before the abnormal traveling information ABN is received. Therefore, the future trajectory TR is predicted relatively simpler in the example shown in FIG. 5 than in the example shown in FIG. 3.

In the example shown in FIG. 5, the controlled traffic lights are the traffic lights 51 and 52, and the light of the controlled traffic lights is changed from "green" to "red". The effect achieved in this example is the same as that in the example shown in FIG. 3.

As described above, the communication vehicle 30 performs abnormal traveling determination in this embodiment. When abnormal traveling is detected by the abnormal traveling determination and, as a result, the abnormal traveling information ABN is sent from the communication vehicle 30 to the management server 10, the management server 10 performs emergency control. The emergency control, performed in this way, makes it possible to alert the vehicles and pedestrians around the future trajectory TR to this abnormal traveling. Therefore, the effect of an accident caused by the abnormal traveling can be minimized.

The traffic light management system and the traffic light management method according to the embodiment will be described below more in detail.

2. Traffic Light Management System 2-1. Example of Overall Configuration

Figure 6:
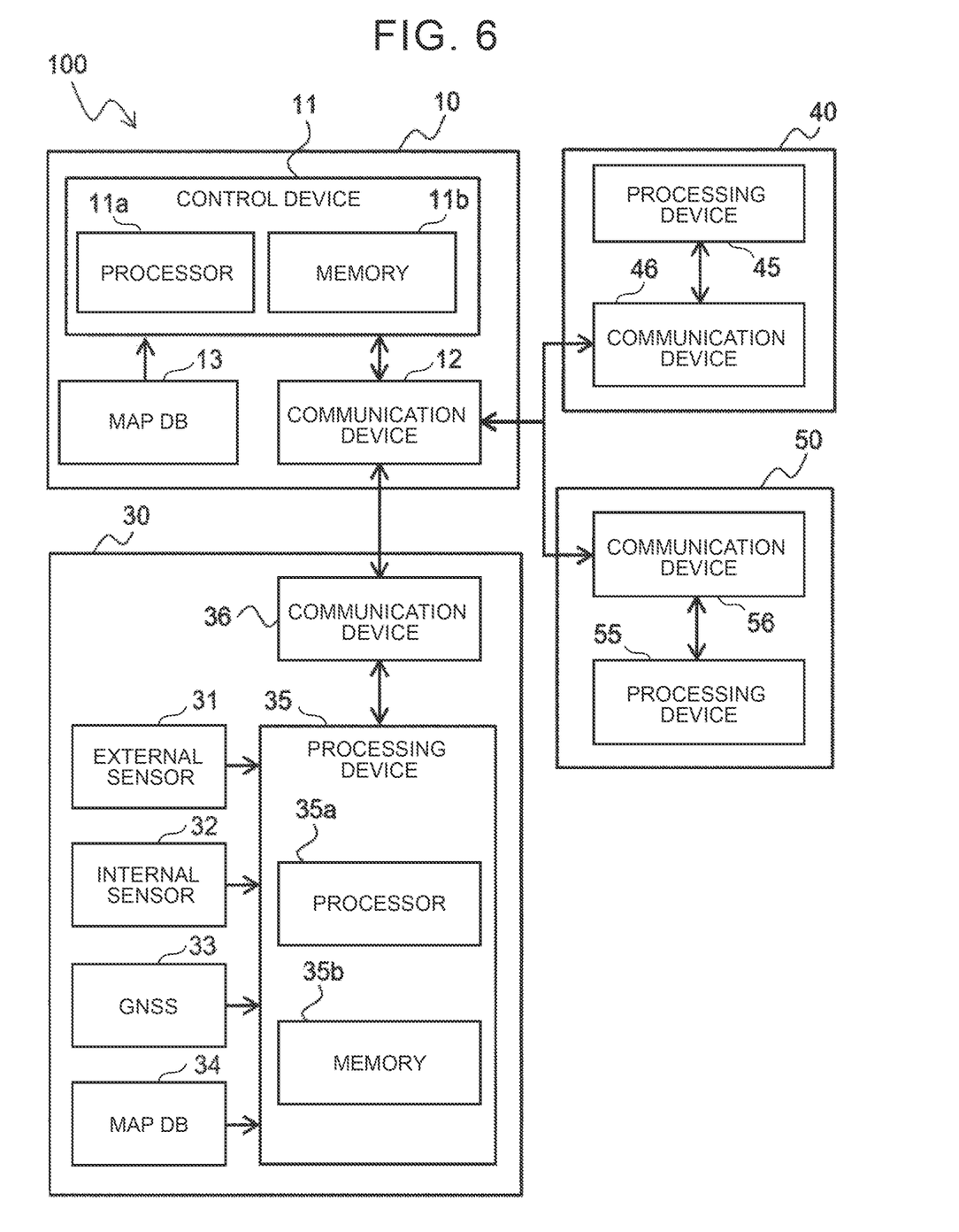
FIG. 6 is a block diagram showing a configuration example of the traffic light management system according to the embodiment.

FIG. 6 is a block diagram showing an example of the configuration of the traffic light management system according to the embodiment. As shown in FIG. 6, the traffic light management system 100 includes the management server 10, the communication vehicle 30, and the traffic lights 40 and 50. Communication between the management server 10 and the communication vehicle 30 is carried out via the network 20 and the base station 60 as described in FIG. 1. Communication between the management server 10 and the traffic light 40 and between the management server 10 and the traffic light 50 is also carried out as described in FIG. 1.

As shown in FIG. 6, the management server 10 includes a control device 11, a communication device 12, and a map database (map DB) 13.

The control device 11 is configured by a computer having at least one processor 11a and at least one memory 11b. At least one program is stored in the memory 11b. A program is read from the memory 11b for execution by the processor 11a to implement various functions of the control device 11. One of these various functions is the emergency control function described above. Various types of information acquired via communication with the communication vehicle 30 is also stored in the memory 11b. The display information acquired via communication with the traffic lights 40 and 50 is also stored in the memory 11b.

The communication device 12 acquires various types of information from the communication vehicle 30 and from the traffic lights 40 and 50 via the network 20 and the base station 60. The communication device 12 also sends the emergency control signal ECS to the controlled traffic lights via the network 20 and the base station 60.

The map database 13 is a database that stores map information. Examples of the map information include the road position information, road shape information (for example, whether the road is curved or straight), and position information on intersections and structures. The map information also includes the traffic regulation information. The map database 13 is formed in a predetermined storage device (for example, a hard disk, a flash memory).

The communication vehicle 30 is, for example, an automobile powered by an internal combustion engine such as a diesel engine or a gasoline engine, an electric vehicle powered by an electric motor, or a hybrid vehicle equipped with an internal combustion engine and an electric motor. The electric motor is driven by a battery such as a secondary battery, a hydrogen fuel cell, a metal fuel cell, or an alcohol fuel cell. The communication vehicle 30 includes an external sensor 31, an internal sensor 32, a Global Navigation Satellite System (GNSS) receiver 33, and a map database 34. The communication vehicle 30 also includes a processing device 35 and a communication device (in-vehicle communication device) 36.

The external sensor 31 is a device that detects the surroundings of the communication vehicle 30. Examples of the external sensor 31 include a radar sensor and a camera. The radar sensor uses radio waves (e.g., millimeter waves) or light to detect targets around the communication vehicle 30. Targets include static targets and dynamic targets. Examples of static targets include guardrails and buildings. Dynamic targets include pedestrians, bicycles, motorcycles, and vehicles other than the communication vehicle 30. The camera captures the surroundings of the communication vehicle 30. The external sensor 31 sends the surroundings information to the processing device 35.

The internal sensor 32 is a device that detects the traveling state of the communication vehicle 30. Examples of the internal sensor 32 include a vehicle speed sensor, an acceleration sensor, and a yaw rate sensor. The vehicle speed sensor detects the traveling speed of the communication vehicle 30. The acceleration sensor detects the acceleration of the communication vehicle 30. The yaw rate sensor detects the yaw rate around the vertical axis of the center of gravity of the communication vehicle 30. The internal sensor 32 sends the traveling state information to the processing device 35.

The GNSS receiver 33 is a device that receives signals from three or more artificial satellites. The GNSS receiver 33 is also a device that acquires the position information on the communication vehicle 30. The GNSS receiver 33 calculates the position and attitude (orientation) of the communication vehicle 30 based on the received signals. The GNSS receiver 33 sends the GNSS information to the processing device 35.

The map database 34 is a database that stores map information. Examples of the map information include the same information that is stored in the map database 13. The map database 34 is formed in an in-vehicle storage device (for example, a hard disk or a flash memory). The map database 34 may be formed in a computer installed in a facility capable of communicating with the communication vehicle 30. This computer may be the computer of the management server 10. That is, the map database may be shared between the management server 10 and the communication vehicle 30.

The surroundings information received from the external sensor 31, the traveling state information received from the internal sensor 32, the GNSS information received from the GNSS receiver 33, and the map information stored in the map database 34 are included in the "driving environment information" on the communication vehicle 30. Therefore, in the present application, the external sensor 31, the internal sensor 32, the GNSS receiver 33, and the map database 34 are collectively referred to as "acquisition devices" for acquiring the driving environment information.

The processing device 35 is configured by a microcomputer having at least one processor 35a and at least one memory 35b. At least one program is stored in the memory 35b. A program is read from the memory 35b for execution by the processor 35a to implement various functions of the processing device 35. Examples of these functions include the function to process the surroundings information received from the external sensor 31 and the function to process the traveling state information received from the internal sensor 32.

The various functions of the processing device 35 also include the function to process the abnormal traveling determination. In the abnormal traveling determination, the external recognition information around the communication vehicle 30 is acquired based on the surroundings information received from the external sensor 31. Then, based on this external recognition information and the traveling state information on the communication vehicle 30, it is determined whether the traveling state of any one of the vehicles around the communication vehicle 30 is abnormal. Alternatively, based on this external recognition information and the traveling state information on the communication vehicle 30, it is determined whether the traveling state of the communication vehicle 30 itself is abnormal. When it is determined that there is a vehicle in the abnormal traveling state, the abnormal traveling information ABN is generated. Examples of the abnormal traveling information ABN include the traveling state information on the abnormally traveling vehicle (that is, vehicle 80 or communication vehicle 30).

The communication device 36 wirelessly communicates with the nearest base station 60. Examples of communication standards used for this wireless communication include mobile communication standards such as the 4G, LTE, or 5G communication standard. The communication device 36 is connected to the communication device 12 of the management server 10 over the network 20. For example, the ID information and the traveling state information on the communication vehicle 30 are sent from the communication device 36 to the communication device 12. The surroundings information, received from the external sensor 31, may also be sent from the communication device 36 to the communication device 12. When the abnormal traveling determination is performed, the abnormal traveling information ABN is sent from the communication device 36 to the communication device 12 depending upon the result.

The traffic light 40 includes a processing device 45 and a communication device 46. The traffic light 50 includes a processing device 55 and a communication device 56. The basic configuration of the traffic light 40 and that of the traffic light 50 are the same. Therefore, in the description below, the configuration of only the traffic light 40 will be described.

The processing device 45 is configured by a microcomputer having at least one processor and at least one memory. At least one program is stored in the memory. A program is read from the memory for execution by the processor to implement various functions of the processing device 45. Examples of the various functions include the processing of the lighting function that controls the lights according to a preset control pattern and the processing of changing the lights when a moving object is detected in front of the traffic light 40.

The communication device 46 wirelessly communicates with the nearest base station 60. Examples of communication standards for this wireless communication include mobile communication standards such as the 4G, LTE, or 5G communication standard. The communication device 46 is connected the communication device 12 of the management server 10 over the network 20. For example, the display information on the traffic light 40 is sent from the communication device 46 to the communication device 12.

The traffic lights 40 and 50 may be equipped with an alarm device that issues an alarm of a predetermined frequency.

2-2. Example of Emergency Control Processing

Figure 7:
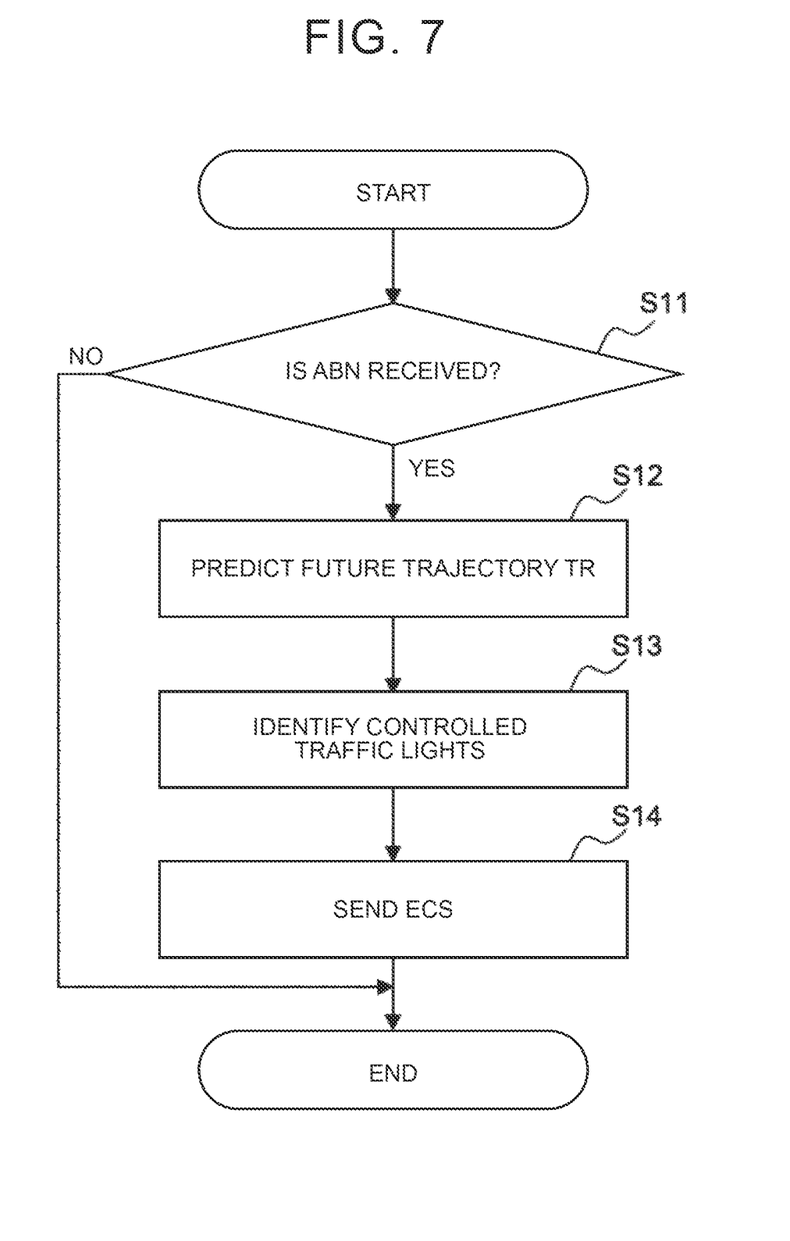
FIG. 7 is a flowchart showing a flow of emergency control processing performed by a control device (processor) of a management server.

FIG. 7 is a flowchart showing the flow of emergency control processing performed by the control device 11 (processor 11a). The routine shown in FIG. 7 is repeatedly performed in a predetermined control cycle.

In the routine shown in FIG. 7, it is first determined whether the abnormal traveling information ABN is received (step S11). As described above, the abnormal traveling information ABN includes the traveling state information on the abnormally traveling vehicle (that is, vehicle 80 or communication vehicle 30). When the determination result in step S11 is negative, the current processing ends.

When the determination result in step S11 is affirmative, the future trajectory TR is predicted (step S12). The future trajectory TR is predicted based on the traveling state information on the abnormally traveling vehicle. First, based on the map information and on the position information included in the traveling state information, the current position of the abnormally traveling vehicle is detected. In addition, the current traveling direction of the abnormally traveling vehicle is detected from the history of the position information on the abnormally traveling vehicle. Then, based on the current position, the current traveling direction, and the speed information included in the traveling state information, the future trajectory TR is predicted. The range of time for which the future trajectory TR is predicted is, for example, a period of time from the current time to the time several seconds later.

Following step S12, the controlled traffic lights are identified (step S13). As described above, the controlled traffic lights are the traffic lights 40 and 50 on the road along the future trajectory TR. The specified traffic lights are identified based on the future trajectory TR predicted in step S12 and the map information.

Following step S13, the emergency control signal ECS is sent (step S14). The emergency control signal ECS is sent to the controlled traffic lights identified in step S13.

Figure 8:
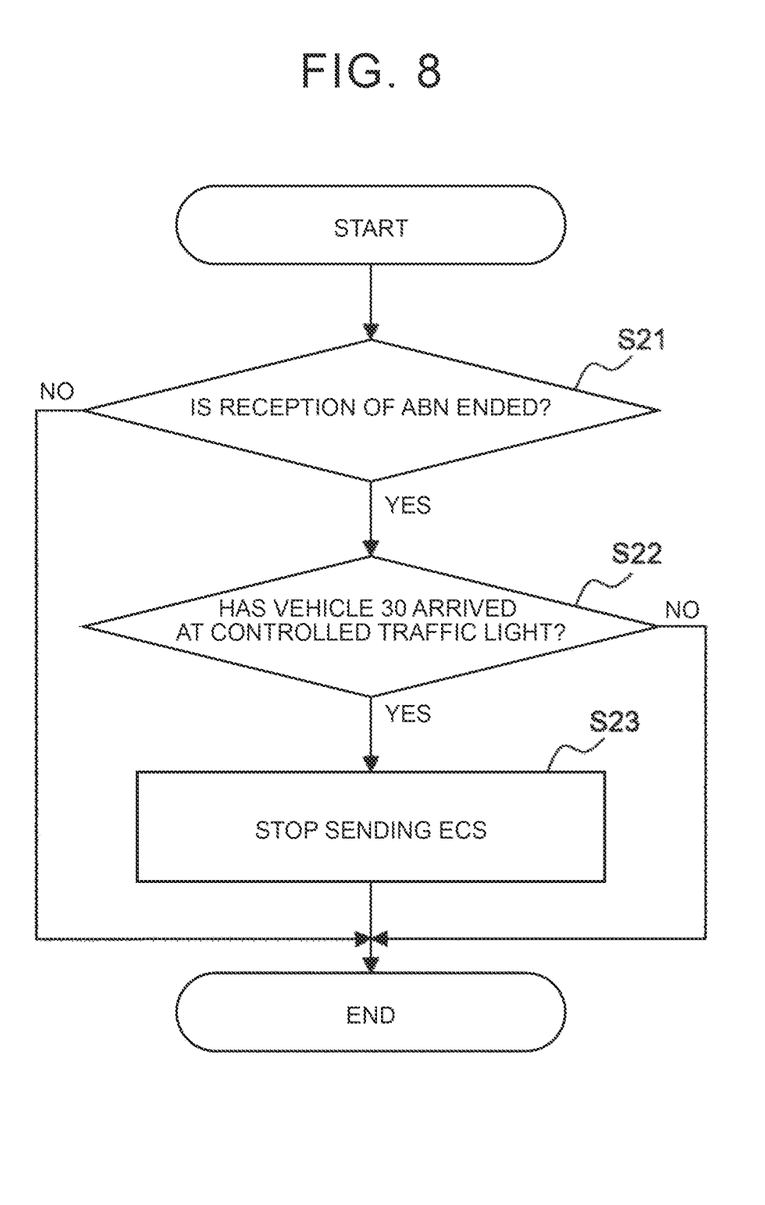
FIG. 8 is a flowchart showing a flow of emergency control processing after sending an emergency control signal.
Figure 9:
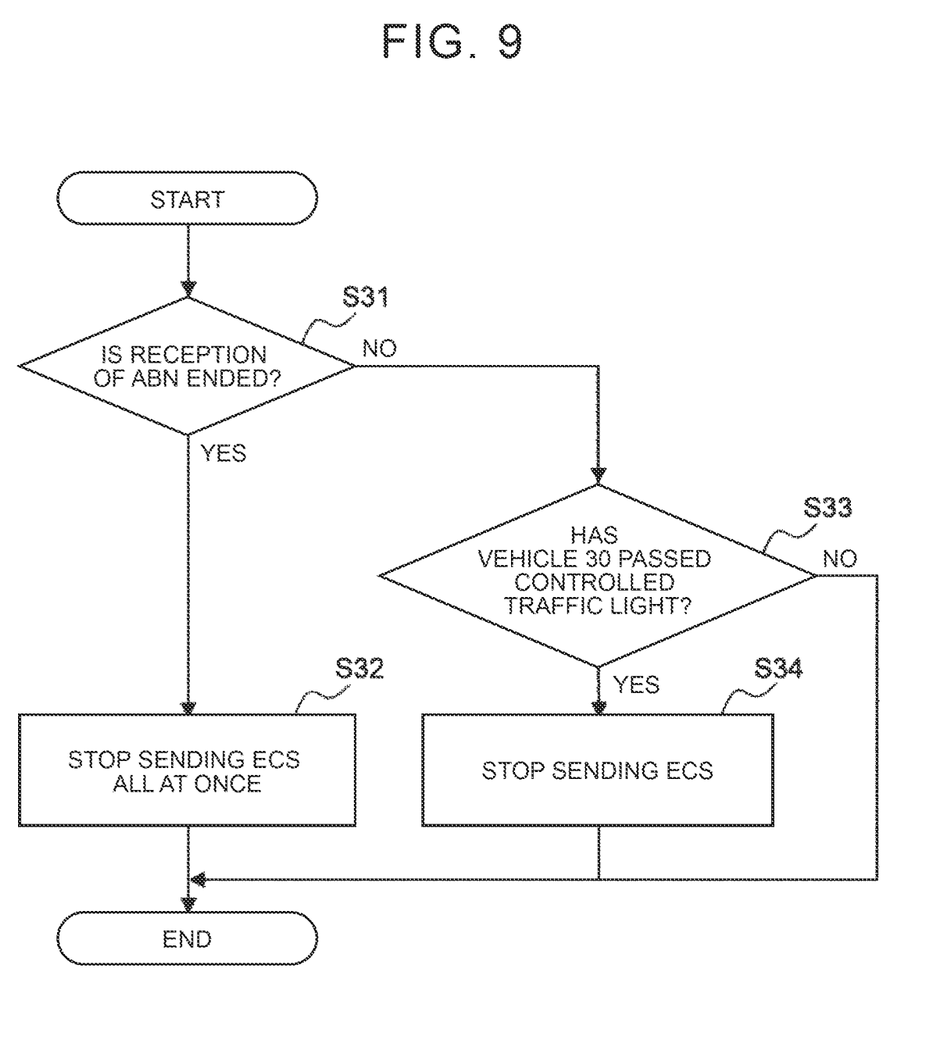
FIG. 9 is a flowchart showing a flow of emergency control processing after sending an emergency control signal.

2-3. Example of Emergency Control Processing after Sending Emergency Control Signal FIG. 8 and FIG. 9 are flowcharts showing the flow of emergency control processing after sending the emergency control signal ECS. The routines shown in FIG. 8 and FIG. 9 are performed by the control device 11 (the processor 11a) following step S14 in FIG. 7. The routines shown in FIG. 8 and FIG. 9 are performed interchangeably according to whether or not the abnormally traveling vehicle is the communication vehicle 30.

The routine shown in FIG. 8 is an example of processing performed when the abnormally traveling vehicle is not the communication vehicle 30. In this routine, it is first determined whether the reception of the abnormal traveling information ABN is ended (step S21). For example, when the distance between the communication vehicle 30 and the abnormally traveling vehicle becomes so large that the abnormally traveling vehicle is not recognized any more, the sending of the abnormal traveling information ABN from the communication vehicle 30 to the management server 10 is ended. This sending is also ended when the abnormal traveling is ended. When this sending is ended, the reception of the abnormal traveling information ABN by the management server 10 is also ended.

When the determination result in step S21 is affirmative, it is determined whether the communication vehicle 30 has arrived before a controlled traffic light (step S22). The processing in step S22 is performed for each of the controlled traffic lights. The processing in step S22 is performed by detecting the current position of the communication vehicle 30. As described above, the current position is detected by combining the map information and the position information on the communication vehicle 30.

When the determination result in step S22 is affirmative, the sending of the emergency control signal ECS is stopped (step S23). As described above, the processing in step S22 is performed for each of the controlled traffic lights. Therefore, the processing in step S23 is also performed for each of the controlled traffic lights.

The routine shown in FIG. 9 is an example of processing performed when the abnormally traveling vehicle is the communication vehicle 30. In this routine, it is first determined whether the reception of the abnormal traveling information ABN is ended (step S31). For example, when the abnormal traveling of the communication vehicle 30 is ended, the sending of the abnormal traveling information ABN from the communication vehicle 30 to the management server 10 is ended. When this sending is ended, the reception of the abnormal traveling information ABN by the management server 10 is also ended.

When the determination result in step S31 is affirmative, the sending of the emergency control signal ECS is stopped all at once (step S32). When the reception of the abnormal traveling information ABN is ended, it is estimated that the abnormal traveling of the communication vehicle 30 is ended. Therefore, the sending of the emergency control signal ECS to all controlled traffic lights is stopped all at once.

When the determination result in step S31 is negative, it is determined whether the communication vehicle 30 has passed a controlled traffic light (step S33). The processing in step S33 is performed for each of the controlled traffic lights. The processing in step S33 is performed by detecting the current position of the communication vehicle 30. As described above, the current position is detected by combining the map information and the position information on the communication vehicle 30.

When the determination result in step S33 is affirmative, the sending of the emergency control signal ECS is stopped (step S34). As described above, the processing in step S33 is performed for each of the controlled traffic lights. Therefore, the processing in step S34 is also performed for each of the controlled traffic lights.

3. Effects

In this embodiment, even if a vehicle is traveling abnormally for some reason, emergency control is performed and the emergency control signal ECS is sent to the controlled traffic lights as described above. This makes it possible to alert the vehicles and pedestrians around the future trajectory TR of the abnormally traveling vehicle to this abnormal traveling. Therefore, the effect of an accident caused by the abnormal traveling can be minimized.

In this embodiment, the processing after sending the emergency control signal ECS is performed. This processing releases the control that has been set up by the emergency control signal ECS sent to the controlled traffic lights. Therefore, it is possible to prevent traffic paralysis that may be caused by the continuous sending of the emergency control signal ECS.

What is claimed is:

1. A traffic light management system that manages display of traffic lights, the traffic light management system comprising:
   a communication device configured to communicate with the traffic lights and to communicate with a communication vehicle having a communication function;
   a control device configured to control the display based on information received from the communication vehicle; and
   a map database configured to store map information, wherein:
   the control device is configured to perform emergency control of the display when abnormal traveling information indicating information on an abnormally traveling vehicle is included in the information received from the communication vehicle; and
   in the emergency control, the control device is configured to predict a future trajectory of the abnormally traveling vehicle based on the abnormal traveling information,
   to generate an emergency control signal for temporarily prohibiting passage at an intersection and a crosswalk on a road along the future trajectory based on the map information and the future trajectory, and
   to send the emergency control signal to controlled traffic lights each indicating a traffic light at the intersection and the crosswalk.

2. The traffic light management system according to claim 1, wherein:
   the communication vehicle comprises
   an acquisition device configured to acquire driving environment information on the communication vehicle,
   a processing device configured to perform abnormal traveling determination of vehicles around the communication vehicle based on the driving environment information, and
   an in-vehicle communication device configured to communicate with the communication device; and in the abnormal traveling determination, the processing device is configured
to determine whether there is the abnormally traveling vehicle around the communication vehicle,
to generate the abnormal traveling information as information indicating a traveling state of the abnormally traveling vehicle when it is determined that there is the abnormally traveling vehicle, and
to send the abnormal traveling information to the in-vehicle communication device.

3. The traffic light management system according to claim 2, wherein:
in the emergency control, the control device is configured
to repeatedly perform the sending of the emergency control signal and determination as to whether reception of the abnormal traveling information from the communication vehicle is ended;
to determine whether the communication vehicle has arrived before the controlled traffic light based on the information from the communication vehicle when it is determined that the reception of the abnormal traveling information is ended; and
to stop the sending of the emergency control signal to the controlled traffic light when it is determined that the communication vehicle has arrived before the controlled traffic light.

4. The traffic light management system according to claim 1, wherein:
the communication vehicle comprises
an acquisition device configured to acquire driving environment information on the communication vehicle,
a processing device configured to perform abnormal traveling determination of the communication vehicle itself based on the driving environment information, and
an in-vehicle communication device configured to communicate with the communication device; and
in the abnormal traveling determination, the processing device is configured
to determine whether the communication vehicle is the abnormally traveling vehicle,
to generate the abnormal traveling information as information indicating a traveling state of the communication vehicle when it is determined that the communication vehicle is the abnormally traveling vehicle, and
to send the abnormal traveling information to the in-vehicle communication device.

5. The traffic light management system according to claim 4, wherein:
in the emergency control, the control device is configured
to repeatedly perform the sending of the emergency control signal and determination as to whether the communication vehicle has passed the controlled traffic light; and
to stop the sending of the emergency control signal to the controlled traffic light when it is determined that the communication vehicle has passed the controlled traffic light.

6. A traffic light management method for managing display of traffic lights, the traffic light management method comprising, by a control device that controls the display:
communicating with a communication vehicle having a communication function;
predicting a future trajectory of an abnormally traveling vehicle based on abnormal traveling information when the abnormal traveling information indicating information on the abnormally traveling vehicle is included in information received from the communication vehicle;
generating an emergency control signal for temporarily prohibiting passage at an intersection and a crosswalk on a road along the future trajectory based on map information and the future trajectory; and
sending the emergency control signal to a traffic light at the intersection and the crosswalk.

* * * * *